United States Patent
Hong et al.

(10) Patent No.: US 9,513,426 B2
(45) Date of Patent: Dec. 6, 2016

(54) LIGHT DOWN CONVERSION FILM AND DISPLAY BACKLIGHT UNIT USING THE SAME

(71) Applicant: INDUSTRIAL TECHNOLOGY RESEARCH INSTITUTE, Hsinchu (TW)

(72) Inventors: Qi Hong, Orlando, FL (US); Shin-Tson Wu, Oviedo, FL (US); Kuo-Chang Lee, Pingtung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 288 days.

(21) Appl. No.: 14/521,162

(22) Filed: Oct. 22, 2014

(65) Prior Publication Data
US 2016/0116663 A1    Apr. 28, 2016

(51) Int. Cl.
*F21V 7/04*    (2006.01)
*F21V 8/00*    (2006.01)

(52) U.S. Cl.
CPC .................... *G02B 6/0053* (2013.01)

(58) Field of Classification Search
CPC ... G02B 6/0053; G02B 6/0068; G02B 6/0043; G02F 2001/133614
See application file for complete search history.

(56) References Cited

U.S. PATENT DOCUMENTS 6,744,960 B2 *  6/2004  Pelka ................ B82Y 10/00
                                                   362/259
8,395,312 B2    3/2013  Hum
8,462,292 B2    6/2013  Parker et al.
(Continued)

FOREIGN PATENT DOCUMENTS

TW          I420705         12/2013

OTHER PUBLICATIONS

Z.Y. Zhang, et al., Broadband quantum dot superluminescent LED with angled facet formed by focused ion beam etching, Electronics Letters, May 10, 2007, vol. 43, No. 10.
(Continued)

*Primary Examiner* — Evan Dzierzynski
(74) *Attorney, Agent, or Firm* — Locke Lord LLP; Tim Tingkang Xia, Esq.

(57) ABSTRACT

The disclosure provides a display backlight unit and its light down conversion film. The light down conversion film may include a quantum-dot layer sandwiched between input substrate and an exit substrate. First and second refractive asymmetric micro-prisms are disposed on two opposite input and first exit surfaces of the input substrate, respectively. On the input surface of the input substrate, multiple arrays of the asymmetric refractive asymmetric micro-prisms preserve the large off-axis angle of incident light with first wavelength. On the first exit surface of the input substrate, multiple arrays of the refractive asymmetric micro-prisms increase the reflectance of the large incident angle light. A second exit surface of the exit substrate includes refractive symmetric micro-prisms. The refractive asymmetric micro-prisms of the input substrate and the refractive asymmetric micro-prisms of the exit substrate have rounded tips and valleys for enhancing refraction of the first light and the second light.

20 Claims, 8 Drawing Sheets

(56) References Cited

U.S. PATENT DOCUMENTS

| | | |
|---|---|---|
| 8,593,586 B2 | 11/2013 | Wang et al. |
| 2006/0157686 A1 | 7/2006 | Jang et al. |
| 2007/0024175 A1 | 2/2007 | Chua et al. |
| 2010/0006775 A1 | 1/2010 | Gibson |
| 2012/0113672 A1 | 5/2012 | Dubrow et al. |
| 2012/0280953 A1 | 11/2012 | Cheng et al. |
| 2013/0069089 A1 | 3/2013 | Hussell et al. |
| 2013/0256726 A1* | 10/2013 | Jin ................ G02B 19/0061 257/98 |
| 2016/0103363 A1* | 4/2016 | Ning ............. G02F 1/133603 362/97.1 |

OTHER PUBLICATIONS

Sanghwa Jeong et al., One-Step Preparation of Strongly Luminescent and Highly Loaded CdSe Quantum Dot-Silica Films, J. Phys. Chem. C, 2010, pp. 14362-14367, vol. 114, No. 34.

C.-S. Han et al., Photoenhancement of Quantum Dot Nanocomposite Via UV Annealing and Its Appliction to White LED, 18th International Conference on Composite Materials.

W.-M. Schulz et al., Pulsed single-photon resonant-cavity quantum dot LED, Journal of Crystal Growth, 2011, pp. 127-130, vol. 315.

Hilmi Volkan Demir et al., Spatially Selective Assembly of Quantum Dot Light Emitters in an LED Using Engineered Peptides, American Chemical Society, 2011, pp. 2735-2741, vol. 5, No. 4.

Ju Yeon Woo et al., Thermal behavior of a quantum dot nanocomposite as a color converting material and its application to white LED, Nanotechnology, 2010, pp. 1-8, vol. 21.

* cited by examiner

LIGHT DOWN CONVERSION FILM AND DISPLAY BACKLIGHT UNIT USING THE SAME

TECHNICAL FIELD

This disclosure relates to a light down conversion film and a display backlight unit using the same.

BACKGROUND

A quantum-dot (QD) backlight is recognized as a promising solution to wide color gamut liquid crystal displays. The narrow emission spectrum enables vivid and realistic colors, the dot-size/composition dependent emission wavelength allows high optical efficiency and low crosstalk between colors through matching the transmission peak of color filters. Unlike quantum-dot, light emitting diode (LED) which encapsulates quantum dots into a light emitting diode package, remote phosphor quantum-dot film disperses quantum dots inside an optical film to avoid high operating temperature and high light flux for higher efficiency and second lifetime.

In an edge-lit liquid crystal display backlight, a quantum dot diffuser film can be inserted between a light guide plate and light recycling films. Quantum dots of the quantum dot diffuser film are suspended in a matrix sandwiched between a top substrate and a bottom substrates. The blue excitation light is provided by blue light emitting diodes, reflected by an extractor and a reflector beneath the light guide plate and spread out uniformly over the backlight by the light guide plate. Entering the quantum-dot film, partial of the blue light is absorbed after hitting the quantum dots, then down-converted and re-emitted as red and green lights. The remaining blue light passes through and reaches the light recycling films. The light recycling films collimate and recycle the lights or the light passes through the films and towards the liquid crystal display.

Optical efficiency of quantum-dot backlight depends on the performances of quantum-dot materials and the utilization of incident blue light. Down-converting occurs when the excitation light ray hit quantum-dot particle. Although high particle density increases the possibility of down conversion, current high cost of quantum dot material limits the quantity to be used.

Adding light scattering features to top and bottom surfaces of the quantum-dot film helps extract the isotropic re-emitted lights and increases the optical path of incident blue light. However, inserting light scattering particles to quantum-dot film also increases the optical paths of the reemitted light, which results in extra light loss due to secondary absorption as a side effect.

Diffusive quantum-dot films have low utilization efficiency of incident excitation light, the diffusive quantum-dot films use large quantities of expensive quantum-dot materials. The diffusive quantum-dot films also use additional volume scattering particles to scatter the incident excitation light for increasing the optical path and improving the utilization of incident excitation light. The diffusive quantum-dot films also need light scattering features on top and bottom surfaces to improve the extraction of the re-emitted light. These make the diffusive quantum-dot films very expensive and limit the applications. There exists a need to improve the cost-performance of the quantum-dot lighting methods and devices exhibiting high color purity, high efficiency, and improved light color characteristics.

SUMMARY

In one embodiment, the present disclosure provides a display backlight unit comprises at least one light source, at least one light guide plate and a light down conversion film. The at least one light source comprises a light emission window and is adapted to emit first light with first wavelength through the light emission window. The light guide plate is located adjacent to the light emission window of the at least one light source. The light guide plate includes an input edge and a light-guide exit surface and is adapted to receive the first light via the input edge and spread out the first light within the light guide plate, to extract the first light uniformly over the back light unit, the first light extracted exiting the light guide plate via the light-guide exit surface at a range of off-axis angles, and an illuminance of the first light extracted is allowed to have fluctuations across the back light unit. The light down conversion film comprises a quantum-dot layer with more than one population of quantum dots and an input substrate. The input substrate is disposed on the light-guide exit surface of the light guide plate, the quantum dots are adapted to absorb a part of the first light with first wavelength which exits by the light guide plate and the input substrate in sequence before down-convert into second light with second wavelength and reemit. Other part of the first light which is unabsorbed passes through the light down conversion film. The input substrate includes an input surface facing towards the light guide plate and a first exit surface facing towards the quantum-dot layer. The input surface comprises a plurality of first refractive asymmetric micro-prisms. Each of the first refractive asymmetric micro-prisms includes a first steep segment facing toward the input edge of the light guide plate and a first shallow segment connected to the first steep segment. The first exit surface of the input substrate faces the quantum-dot layer, the first exit surface of the input substrate comprises a plurality of second refractive asymmetric micro-prisms and each includes a second steep segment facing away from the input edge of the light guide plate and a second shallow segment connected to the second steep segment. The first steep segments and the first shallow segments adjacent to each other form a first rounded tip and a first rounded valley for refraction of the first light and the second light. The second steep segments and the second shallow segments adjacent to each other form a second rounded tip and a second rounded valley for refraction of the first light and the second light.

In another embodiment, the present disclosure provides a light down conversion film comprising a quantum-dot layer with more than one population of quantum-dots and an input substrate including an input surface and a first exit surface that are opposite to each other, and a plurality of first refractive asymmetric micro-prisms. The input substrate is for receiving first light from the input surface, the first exit surface faces towards the quantum-dot layer, the quantum dots are for absorbing a part of the first light with first wavelength from the first exit surface of the input substrate then down-converting into second light with second wavelength and reemitting. Another part of the first light which is unabsorbed passes through the quantum-dot layer. Each of first refractive asymmetric micro-prisms, disposed on the input surface, includes a first steep segment facing away from the quantum-dot layer and a first shallow segment connected to the first steep segment. The first steep segments and the first shallow segments adjacent to each other form a first rounded tip and a first rounded valley therebetween for refraction of the first light and the second light.

In yet another embodiment, the present disclosure provides a light down conversion film comprising a quantum-dot layer with more than one population of quantum-dots, and an input substrate including an input surface facing towards the quantum-dot layer, a first exit surface facing towards the quantum-dot layer and a plurality of refractive asymmetric micro-prisms disposed on the first exit surface. The input substrate is for receiving first light from the input surface, the quantum-dots are for absorbing a part of the first light with first wavelength from the first exit surface of the input substrate then down-converting into second light with second wavelength and reemitting. Another part of the first light which is unabsorbed passes through the quantum-dot layer. Each of the refractive asymmetric micro-prisms comprises a first steep segment facing towards the quantum-dot layer and a first shallow segment connected to the first steep segment. The first steep segments and the first shallow segments adjacent to each other form a first rounded tip and a first rounded valley therebetween for refraction of the first light and the second light.

Additional features and advantages of the disclosure will be set forth in the description that follows, and in part will be apparent from the description, or may be learned by practice of the disclosure. The advantages of the disclosure will be realized and attained by the structure and particularly pointed out in the written description and claims hereof as well as the appended drawings.

It is to be understood that both the foregoing general description and the following detailed description are exemplary and explanatory and are intended to provide further explanation of the disclosure as claimed.

BRIEF DESCRIPTION OF THE DRAWINGS

The present disclosure will become more fully understood from the detailed description given herein below, along with the accompanying drawings which are for illustration, thus are not limitative of the present disclosure, and wherein:

FIG. 1b shows a partially enlarged view of the display backlight unit in FIG. 1a.

FIG. 1c shows a perspective view of the quantum-dot film of the display backlight unit in FIG. 1a.

DETAILED DESCRIPTION

Figure 1A:
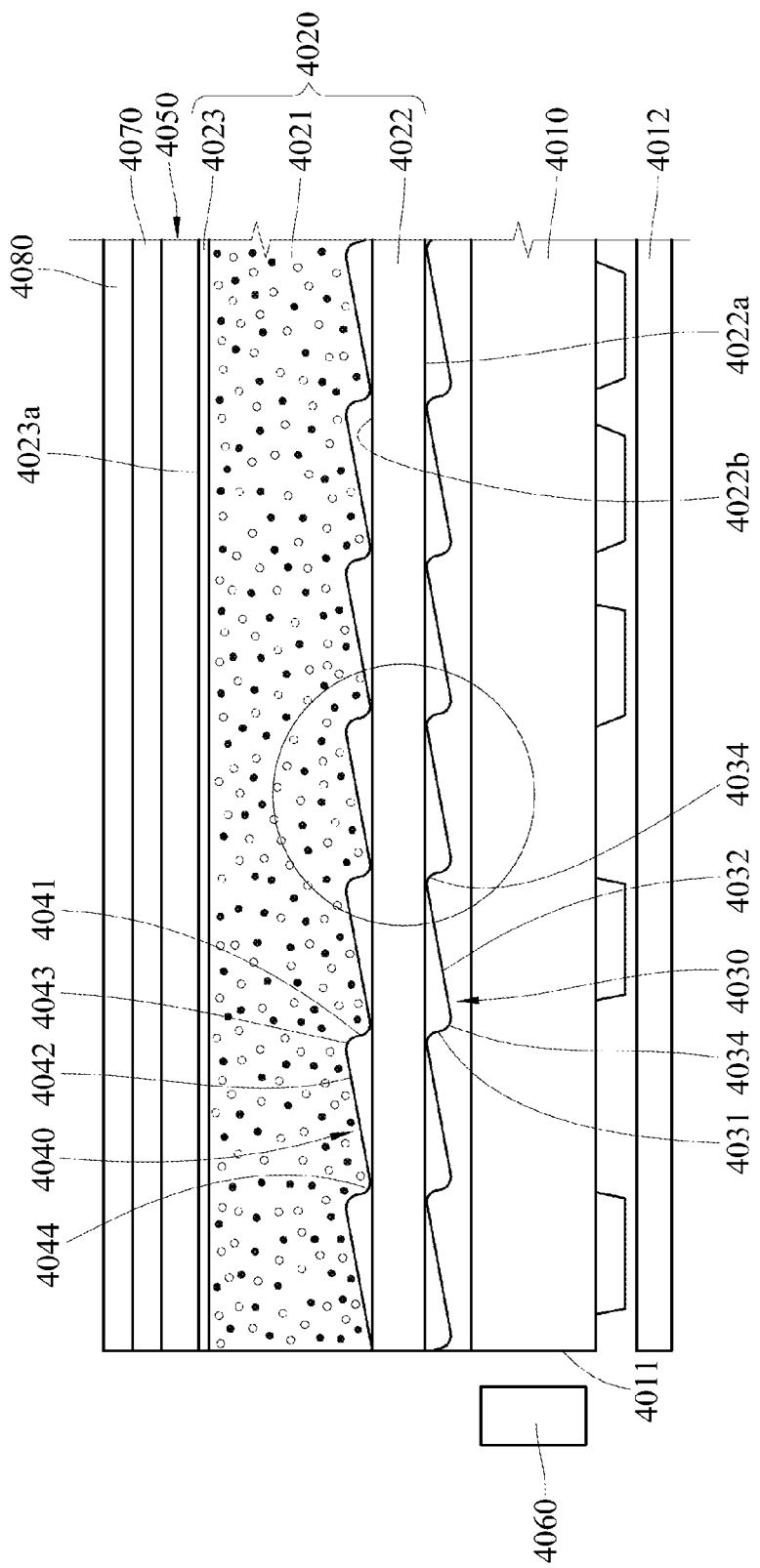
FIG. 1a shows a display backlight unit using the high efficient quantum-dot film in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure may be related to pure color and high efficiency lighting methods and devices using quantum dot. The present disclosure is yet related to adjust the emitted color through adjusting size of quantum-dots and/or composition and/or the concentrations of one or more than one population of quantum-dots. The present disclosure is yet related to quantum-dot films (quantum-dot films) and the related lighting methods and devices. In this embodiment, the lighting devices include, but not limited to, a backlighting for electronic display devices, such as light emitting diode (LED) module. In other embodiments, the backlighting is a fluorescent module. Moreover, in this embodiment, the quantum-dot films of the present disclosure can be used in any suitable application, including but not limited to a liquid crystal display (liquid crystal display) backlighting, down lighting, indoor or outdoor lighting, biological, and other applications; as well as additional lighting applications which will be apparent to those of ordinary skill in the art upon investigating the disclosure described herein.

Figure 1B:
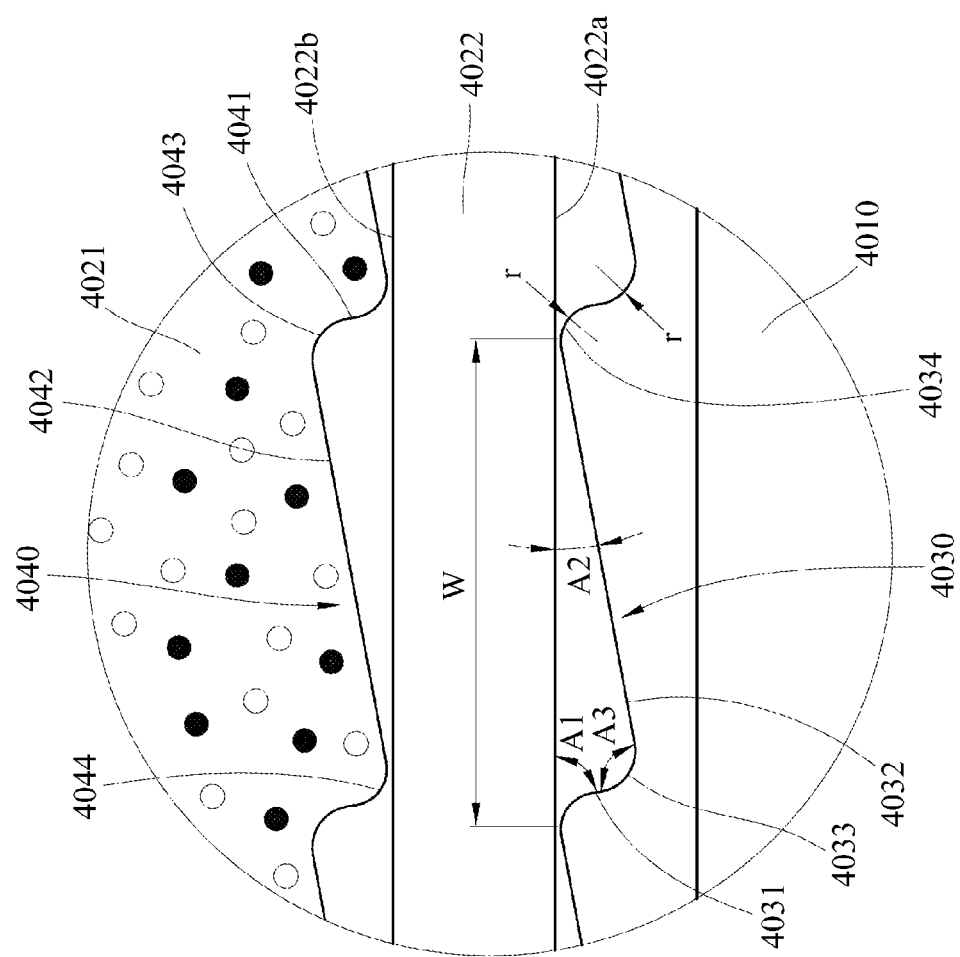
Figure 1C:
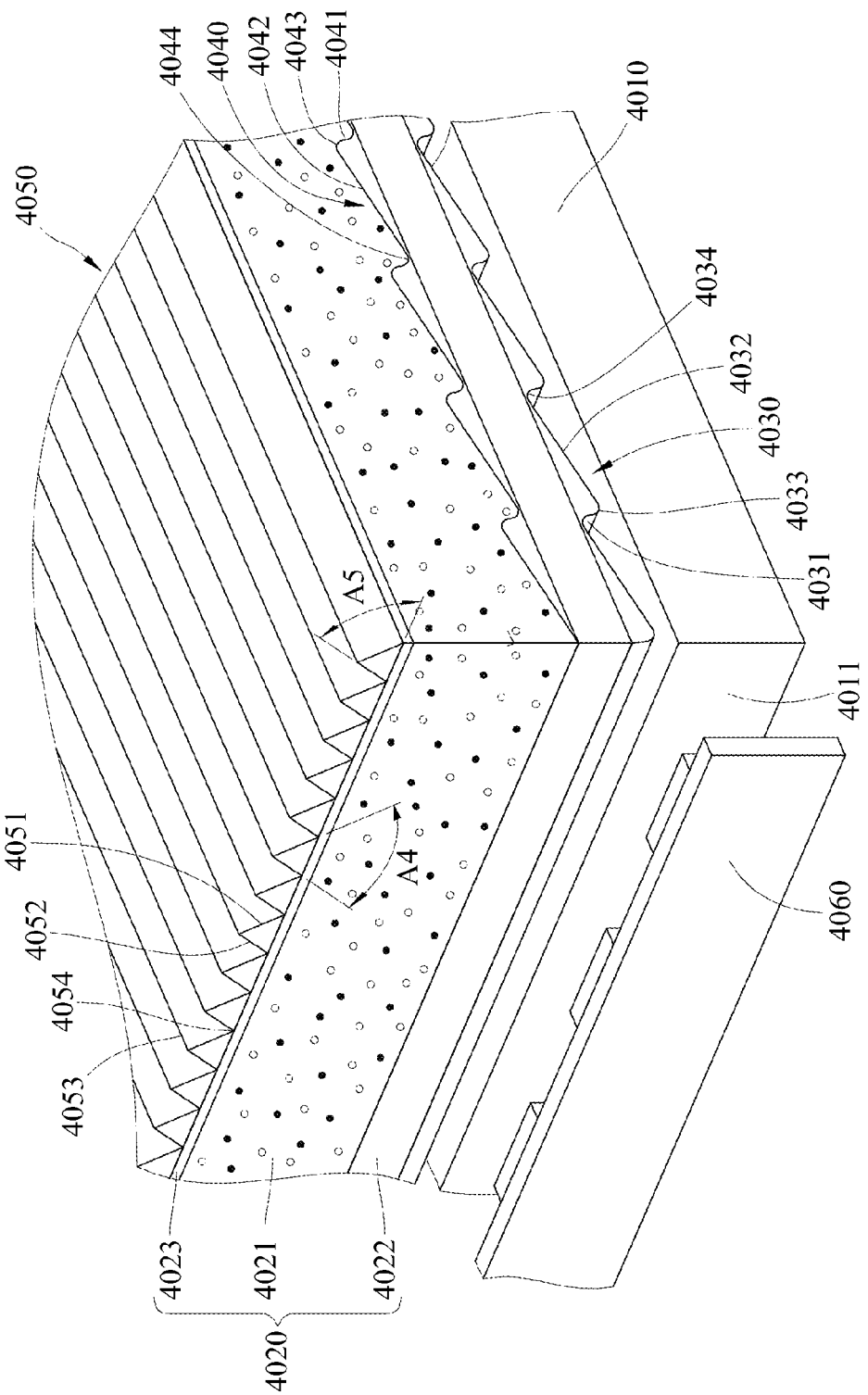
Figure 1D:
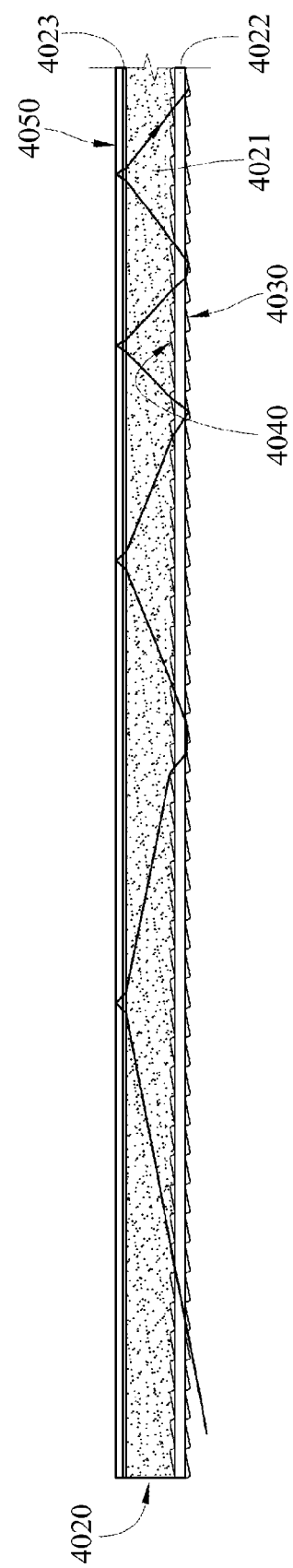
FIG. 1d shows the details of light passing through the quantum-dot film in accordance with the present disclosure, whereby the parallel arranged refractive asymmetric micro-prisms are on the two surfaces of the input substrate.

FIG. 1a shows the schematic diagram of a liquid crystal display backlight using the presented remote phosphor quantum-dot film. FIG. 1b shows a partially enlarged view of the display backlight unit in FIG. 1a. FIG. 1c shows a perspective view of the quantum-dot film of the display backlight unit in FIG. 1a. FIG. 1d shows the details of light passing through the quantum-dot film in accordance with the present disclosure, whereby the parallel arranged refractive asymmetric micro-prisms are on the two surfaces of the input substrate. Referring to FIGS. 1a-1d, the display back light unit comprises a light guide plate 4010, a quantum-dot film 4020, an edge-lit blue light emitting diodes 4060 for emitting blue light (first light) with first wavelength, stacks of optical films 4070 and a liquid crystal display 4080. The quantum-dot film 4020 (namely, light down conversion film) is deposited between the light guide plate 4010 and the stacks of optical films 4070. The liquid crystal display 4080 is disposed on the stacks of optical films 4070. Beneath the light guide plate 4010 is a white reflector 4012 and the light guide plate 4010 has an input edge 4011 facing towards the edge-lit blue light emitting diodes 4060. The edge-lit blue light emitting diodes 4060 provide excitation light for the quantum dots. Each of the quantum dots receives and absorbs the blue light. Then, the quantum dots down-convert (namely, transform) the blue light into red light and green light (namely, second light) with second wavelength and reemit. The unconverted blue light illuminates blue pixels of the liquid crystal display 4080. In this embodiment of the disclosure, the first wavelength is shorter than the second wavelength.

According to one exemplary embodiment of the present disclosure, the quantum-dot film 4020 comprises a quantum-dot layer 4021 with uniform thickness, an input substrate 4022 and an exit substrate 4023 on each of the input and exit sides of the quantum-dot layer 4021. One or more than one population of quantum dot nanoparticles are evenly distributed inside the quantum-dot layer 4021. There is no need for additional scattering particle to scatter the incident blue light. In an embodiment, the input substrate 4022 and the exit substrate 4023 include plastic or glass plates. In an embodiment, the input substrate 4022 comprises an input surface 4022a and a first exit surface 4022b that are opposite to each other, a plurality of first refractive asymmetric micro-prisms 4030 and a plurality of second refractive asymmetric micro-prisms 4040. The input surface 4022*a* is deposited with the asymmetric micro-prisms 4030 with capability of refraction, and the first exit surface 4022*b* is deposited with the second refractive asymmetric micro-prisms 4040 with capability of refraction. In an embodiment, the first refractive asymmetric micro-prisms 4030 and the second refractive asymmetric micro-prisms 4040 are adjacent to each other without gap therebetween. In an embodiment, the length direction of the first refractive asymmetric micro-prisms 4030 and the second refractive asymmetric micro-prisms 4040 on the two input surfaces 4022*a* and first exit surface 4022*b* of the input substrate 4022 are oriented in the direction parallel to the length direction of the input edge 4011 of the light guide plate 4010, which is illustrated in FIGS. 1*a*-1*c*. Each of the first refractive asymmetric micro-prisms 4030 has a steep segment 4031 and a shallow segment 4032 that are connected to each other. Each of the second refractive asymmetric micro-prisms 4040 has a steep segment 4041 and a shallow segment 4042 that are connected to each other. In an embodiment, the steep segments 4031 of the first refractive asymmetric micro-prisms 4030 on the input surface 4022*a* of the input substrate 4022 are facing toward the input edge 4011 of the light guide plate 4010, and the steep segments 4041 of the second refractive asymmetric micro-prisms 4040 on the first exit surface 4022*b* of the input substrate 4022 are facing away from the input edge 4011 of the light guide plate 4010. The above-mentioned arrangement of the steep segments 4031 facing toward the input edge 4011 and the steep segments 4041 facing away from the input edge 4011 are called parallel arrangement. The surface normal of the steep segment 4031 of the first refractive asymmetric micro-prisms 4030 on the input surface 4022*a* of the input substrate 4022 is parallel to the surface normal of the steep segment 4041 of the second refractive asymmetric micro-prisms 4040 on the first exit surface 4022*b* of the input substrate 4022, and the surface normal of the shallow segment 4032 of the first refractive asymmetric micro-prisms 4030 on the input surface 4022*a* of the input substrate 4022 is parallel to the surface normal of the shallow segment 4042 of the second refractive asymmetric micro-prisms 4040 on the first exit surface 4022*b* of the input substrate 4022, which forms the parallel arrangement of the first refractive asymmetric micro-prisms 4030 and the second refractive asymmetric micro-prisms 4040 on the input surface 4022*a* and the first exit surface 4022*b* of the input substrate 4022. The parallel arrangement of the first refractive asymmetric micro-prisms 4030 and the second refractive asymmetric micro-prisms 4040 on the input surfaces 4022*a* and the first exit surface 4022*b* of the input substrate 4022 maintain the large off-axis angle of the incident blue light inside the quantum-dot layer 4021, regardless the difference between the refractive index of the input substrate 4022 and the refractive index of the quantum-dot layer 4021. The anti-parallel arrangement, i.e., the steep segments 4031 of the first refractive asymmetric micro-prisms 4030 on the input surfaces 4022*a* and the steep segments 4041 of the second refractive asymmetric micro-prisms 4040 on the first exit surface 4022*b* of the input substrate 4022 are facing toward the input edge 4011 of the light guide plate 4010, would not provide such functionality (shown in FIG. 2, which shows the details of light passing through quantum-dot film in accordance with the present disclosure, whereby anti-parallel arranged refractive asymmetric micro-prisms are on the two surfaces of the input substrate.) Referring back to FIGS. 1*b*, which highlights the parallel arrangement of the first refractive asymmetric micro-prisms 4030 on the two input surfaces 4022*a* and the second refractive asymmetric micro-prisms 4040 on the first exit surface 4022*b* of the input substrate 4022, the sizes of each of the first refractive asymmetric micro-prisms 4030 and the second refractive asymmetric micro-prisms 4040 are sufficiently large to avoid scattering or diffusing incident blue light. In an embodiment, the base widths w of the first refractive asymmetric micro-prism 4030 and the second refractive asymmetric micro-prism 4040 are between 10 um to 200 um. In an embodiment, the heights of the first refractive asymmetric micro-prism 4030 and the second refractive asymmetric micro-prism 4040 are between 1 um to 50 um. In an embodiment, the tilt angle A1 between the steep segment 4031 of the first refractive asymmetric micro-prism 4030 and the input surface 4022*a* is between 50 to 89 degrees, and the tilt angle A1 between the steep segment 4041 of the second refractive asymmetric micro-prism 4040 and the first exit surface 4022*b* is between 50 to 89 degrees. In an embodiment, the tilt angle A2 between the shallow segment 4032 of the first refractive asymmetric micro-prism 4030 and the input surface 4022*a* is between 1 to 40 degrees, and the tilt angle A2 between the shallow segment 4042 of the second refractive asymmetric micro-prism 4040 and the first exit surface 4022*b* is between 1 to 40 degrees. In an embodiment, the included angle A3 between the steep segment 4031 and the shallow segment 4032 of the first refractive asymmetric micro-prisms 4030 is between 80 to 120 degrees, and the included angle A3 between the steep segment 4041 and the shallow segment 4042 of the second refractive asymmetric micro-prisms 4040 is between 80 to 120 degrees. Furthermore, the word "asymmetric" of the first refractive asymmetric micro-prisms 4030 and the second refractive asymmetric micro-prisms 4040 means the structure may be asymmetrically arranged along the cross-sectional view.

The first refractive asymmetric micro-prisms 4030 on the input surface 4022*a* have first rounded tips 4033 and first rounded valleys 4034 that are alternatively formed between the steep segments 4031 and the shallow segments 4032 of the first refractive asymmetric micro-prisms 4030. The second refractive asymmetric micro-prisms 4040 on the first exit surface 4022*b* have second rounded tips 4043 and second rounded valleys 4044 that are alternatively formed between the steep segments 4041 and the shallow segments 4042 of the second refractive asymmetric micro-prisms 4040, respectively. The first rounded tips 4033, the second rounded tips 4043, the first rounded valleys 4034 and the second rounded valleys 4044 may enhance the refraction of the light while reducing the scattering of the light since sharp tips and valleys may enhance the scattering. When the refraction of the light is enhanced due to the first rounded tips 4033, the second rounded tips 4043, the first rounded valleys 4034 and the second rounded valleys 4044, the optical path of the light within the quantum-dot layer 4021 is lengthened accordingly, which increases the opportunity of the light hitting the quantum-dot particles. Therefore, three different colors of light may evenly spread out of the quantum-dot film 4020. Each of the first rounded tips 4033 of the first refractive asymmetric micro-prisms 4030 and the second rounded tips 4043 of the second refractive asymmetric micro-prisms 4040 have radius smaller than 10 um. Each of the first rounded valleys 4034 and the second rounded valleys 4044 between the first refractive asymmetric micro-prisms 4030 and the second refractive asymmetric micro-prisms 4040 have radius smaller than 10 um. Surfaces of the first refractive asymmetric micro-prisms 4030 including the first rounded tips 4033 and the second refractive asymmetric micro-prisms 4040 including the second rounded tips 4043 have random areas of plane, curving, sagging, bumping and waviness.

The manufacture processes and material shrinkage and scratching with light guide plate during assembly and/or normal operations may cause rounded tip and rounded valley on the micro-prisms. The radius of the rounded tip and rounded valley are as small as possible. The manufacture processes and material shrinkage may cause curving, sagging, bumping and waviness on the surfaces of the micro-prisms.

In combination of the first refractive asymmetric micro-prisms 4030 located on the input surfaces 4022a of the input substrate 4022 and second refractive asymmetric micro-prisms 4040 on the first exit surfaces 4022b of the input substrate 4022 that are parallel arrangment, to further increase the reflectance on the exit substrate 4023 and trap blue light inside quantum-dot film 4020 for light conversion, and refractive symmetric micro-prisms 4050 are located on an second exit surface 4023a of the exit substrate 4023 which is oppositely away from the quantum-dot layer 4021. Each of the refractive symmetric micro-prisms 4050 has an inclined segment 4051 and an inclined segment 4052 that are connected with each other. The included angle between the inclined segments 4051 and the exit substrate 4023 is the same as the included angle between the inclined segments 4052 and the exit substrate 4023, which means the refractive symmetric micro-prisms 4050 are isosceles in this embodiment. Furthermore, the included angle A4 of the symmetric cross section between the inclined segment 4051 and the inclined segment 4052 is between 60 to 120 degrees. Sharp tips 4053 and sharp valleys 4054 are alternatively formed between the inclined segment 4051 and the inclined segment 4052. In an embodiment, the included angle A4 of the symmetric cross section is 90 degrees. In addition, the included angle AS between the symmetric cross section of the inclined segment 4051 and the second exit surface 4023a is 30 to 60 degrees. The included angle AS between the symmetric cross section of the inclined segment 4052 and the second exit surface 4023a is 30 to 60 degrees. The length direction of the refractive symmetric micro-prism 4050 on the exit substrate 4023 is oriented in the light traveling direction and perpendicular to the first refractive asymmetric micro-prisms 4030 and the second refractive asymmetric micro-prisms 4040, thus the length direction of the refractive symmetric micro-prisms 4050 are perpendicular to the length direction of the input edge 4011 of the light guide plate 4010, as FIGS. 1a and 1c depict.

Figure 3:
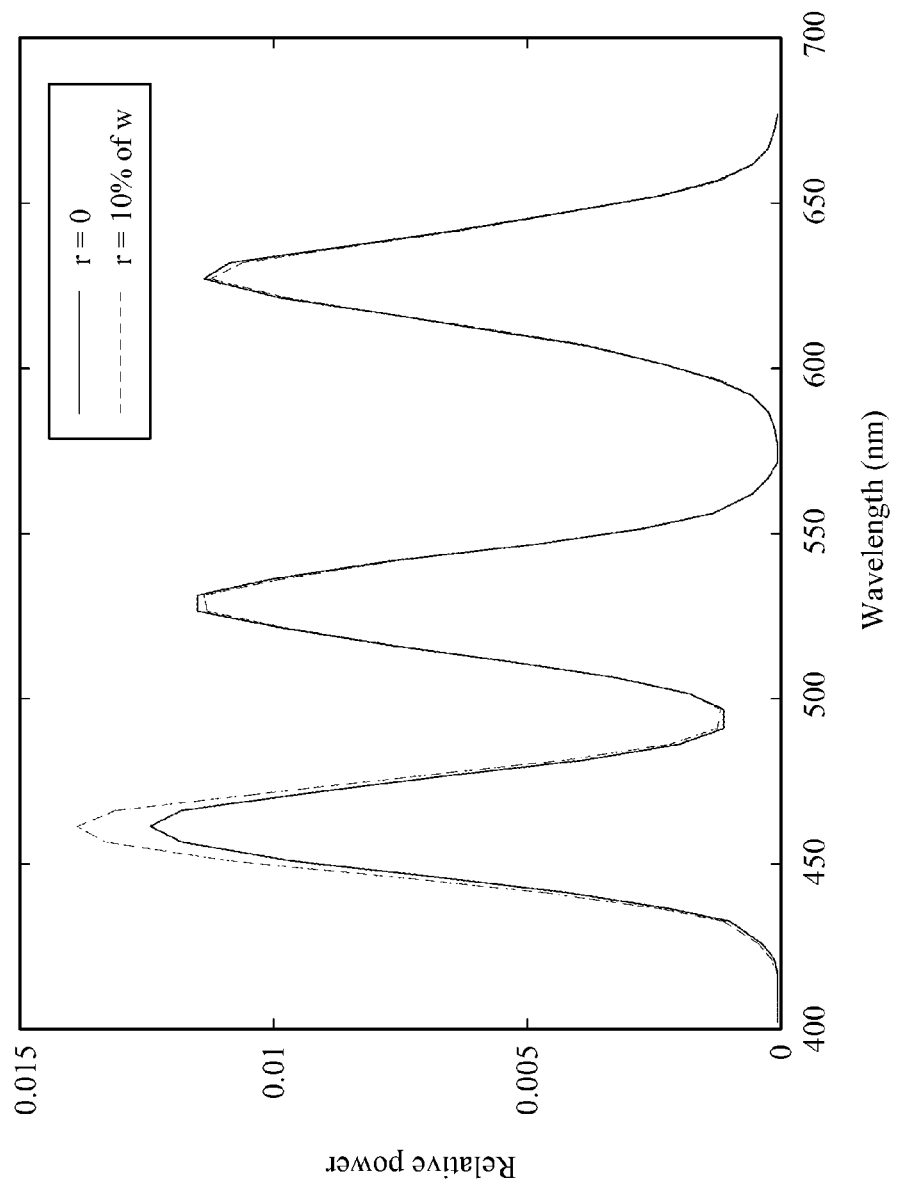
FIG. 3 demonstrates the effeteness of the quantum-dot film with the parallel arranged refractive asymmetric micro-prisms on the two surfaces of the input substrate having rounded tips and valleys in combination with a quantum-dot film without rounded tips and valleys.

Please refer to FIG. 3, which demonstrates the effeteness of the quantum-dot film 4020 with the first refractive asymmetric micro-prisms 4030 and second refractive asymmetric micro-prisms 4040 that are parallel arranged on the input surface 4022a and the first exit surface 4022b of the input substrate 4022 having the first rounded tips 4033, the second rounded tips 4043, the first rounded valleys 4034 and the second rounded valleys 4044 in combination with the quantum-dot film without rounded tips and rounded valleys. In this embodiment, when the radii of first rounded tips 4033, second rounded tips 4043, first rounded valleys 4034, second rounded valleys 4044 are one tenth of the base width w of the first refractive asymmetric micro-prisms 4030 and the second refractive asymmetric micro-prisms 4040, the blue light is greatly diminished, and the green and red light is slightly increased. Therefore the three light is more evenly distributed.

Moreover, in other embodiments, the refractive symmetric micro-prisms 4050 on the second exit surface 4023a of the exit substrate 4023 have tips 4053 and valleys (not shown). The tips 4053 and the rounded valleys are rounded for enhancing the refraction of the light and avoid the scattering of the light, thereby producing more green light and red light while reducing blue light.

In one exemplary embodiment, a refractive index of the quantum-dot layer 4021, a refractive index of the input substrate 4022 and a refractive index of the exit substrate 4023 are identical, which reduces the reflection at the interface so as to enhance the efficiency of the light output. In other embodiment, a refractive index of the quantum-dot layer 4021, a refractive index of the input substrate 4022 and a refractive index of the exit substrate 4023 are different, which enhances the refraction of the light when passing through two different media.

Figure 4:
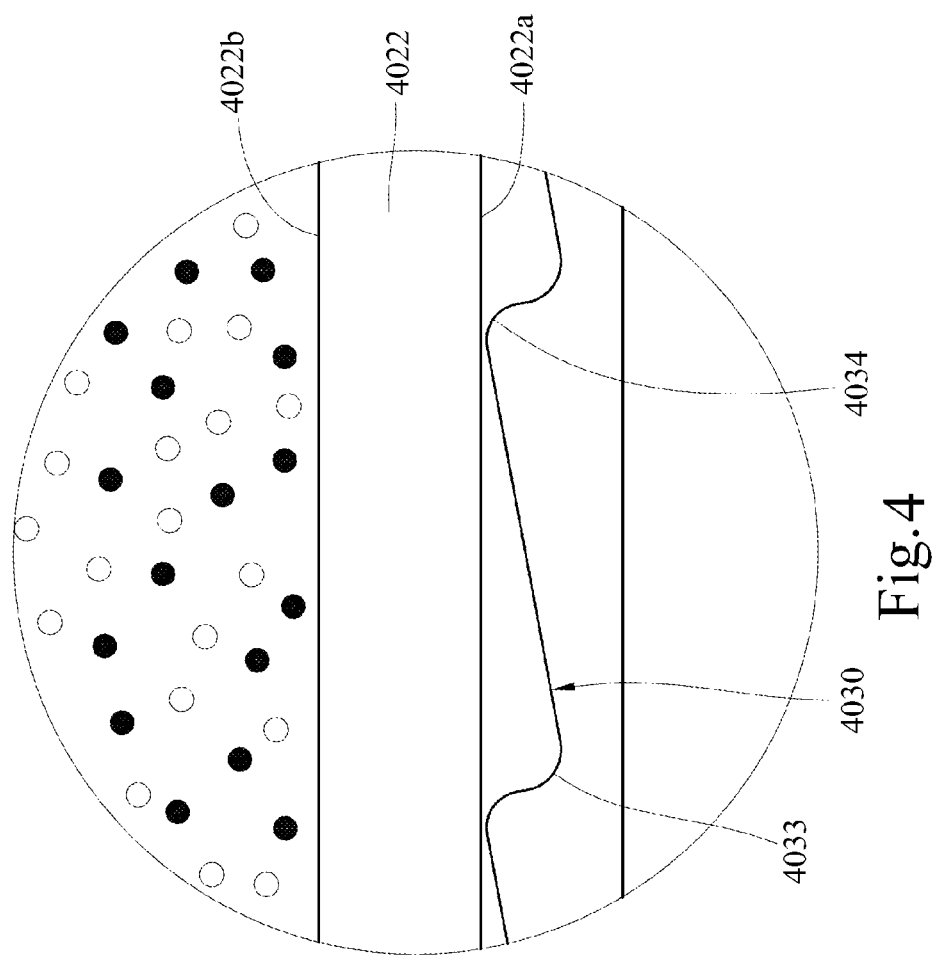
FIG. 4 shows a display backlight unit according another embodiment of the disclosure.

FIG. 4 shows a display backlight unit according yet another embodiment of the disclosure. The configuration is similar to the afore-mentioned embodiments, so repeated description is not described herein again. The difference of this embodiment and the aforementioned embodiments is that the first refractive asymmetric micro-prisms 4030 disposed on the input surface 4022a of the input substrate 4022 has the first rounded tips 4033 and the first rounded valleys 4034. The first exit surface 4022b of the input substrate 4022 is planar and smooth. This type of the input surface 4022a of the input substrate 4022 may also enhance the refraction of the light. Moreover, in one exemplary embodiment, the second exit surface of the exit substrate (not shown) has refractive symmetric micro-prisms with rounded tips and rounded valleys, which also enhance the refraction of the light.

Figure 5:
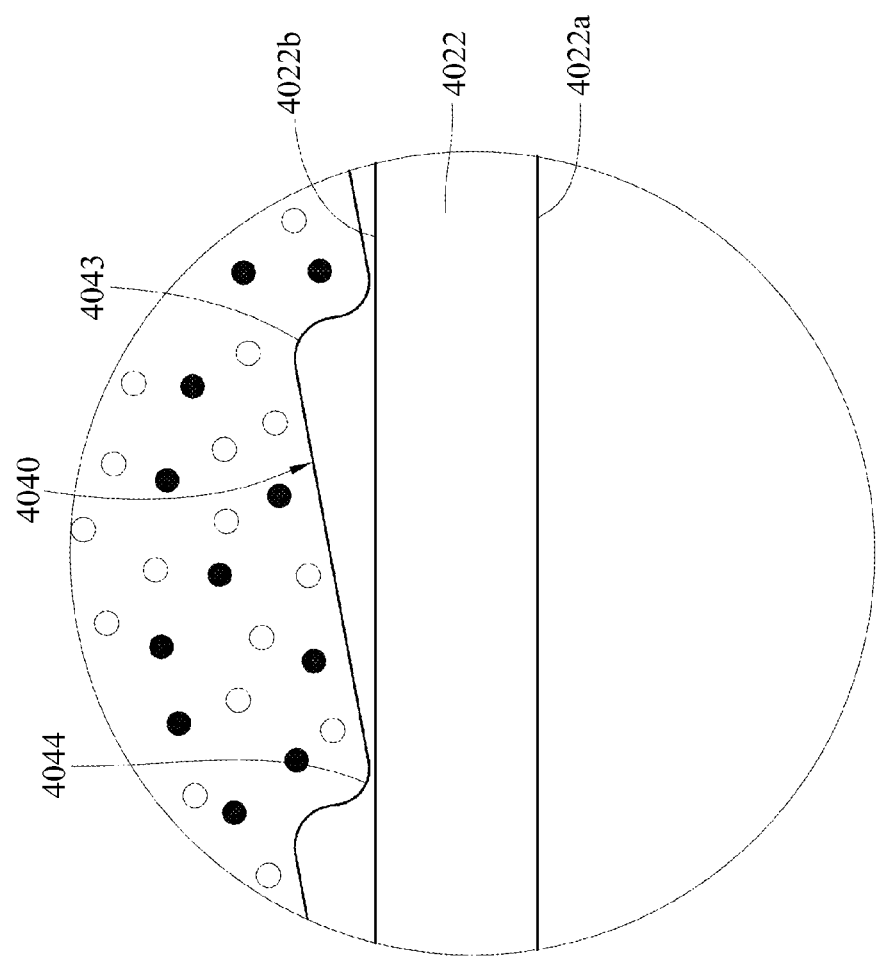
FIG. 5 shows a display backlight unit according yet another embodiment of the disclosure.

FIG. 5 shows a display backlight unit according yet another embodiment of the disclosure. The configuration is similar to the afore-mentioned embodiments, so repeated description is not described herein again. The difference of this embodiment and the aforementioned embodiments is that the second refractive asymmetric micro-prisms 4040 disposed on the first exit surface 4022b of the input substrate 4022 has the rounded tips 4043 and rounded valleys 4044, the input surface 4022a of the input substrate 4022 is planar. This type of the first exit surface 4022b of the input substrate 4022 may also enhance the refraction of the light. Moreover, in one exemplary embodiment, the first exit surface of the exit substrate (not shown) has refractive symmetric micro-prisms with rounded tips and rounded valleys, which also enhance the refraction of the light.

The parallel arranged refractive asymmetric micro-prisms on the two input and first exit surfaces of the input substrate will keep the large incident angle of the incident blue light unchanged after passing through the input substrate and entering the quantum-dot layer, at the same time the transmittance of the incident light on the input substrate and the input surface of the quantum-dot layer are much higher because the incident light is near normal to the steep segment of the parallel arranged refractive asymmetric micro-prisms on the two surfaces of the input substrate. The quantum-dot film having the parallel arranged refractive asymmetric micro-prisms on the two input and first exit surfaces of the input substrate and symmetric micro-prisms on the second exit surface of the exit substrate is able to produce more green light and more red light.

Figure 2:
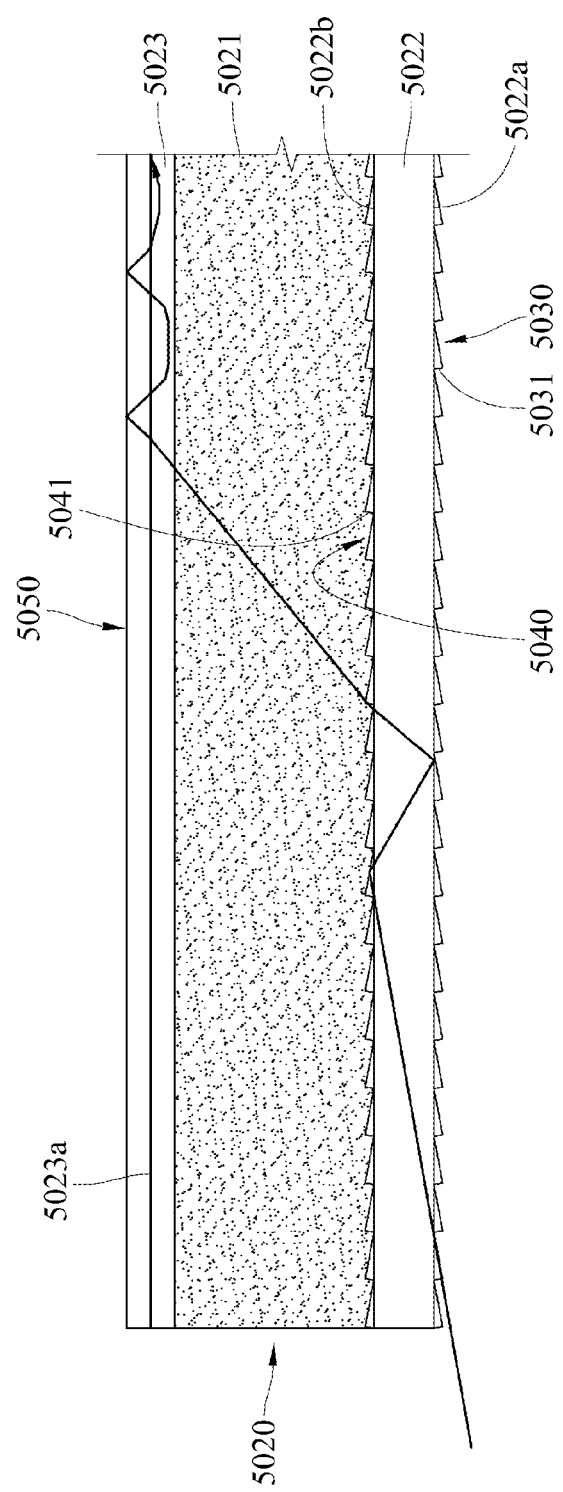
FIG. 2 shows the details of light passing through quantum-dot film in accordance with the present disclosure, whereby anti-parallel arranged refractive asymmetric micro-prisms are on the two surfaces of the input substrate.

FIG. 2 shows the details of light passing through quantum-dot film in accordance with the present disclosure, whereby anti-parallel arranged refractive asymmetric micro-prisms are on the two input and first exit surfaces of the input substrate. If the refractive asymmetric micro-prisms are on both the input and the first exit surfaces of the input substrate, the arrangement is the anti-parallel arrangement, which means the steep segment 5031 and 5041 of the first and second refractive asymmetric micro-prisms 5030 and 5040 face toward the same direction. After passing through the first refractive asymmetric micro-prisms 5030 on the input surface 5022a, the large off-axis angle blue incident light hits the shallow segment 5042 of the second refractive asymmetric micro-prisms 5040 on the first exit surface 5022b of the input substrate, the total internal reflection occurs and the reflected light is folded toward on-axis. This further reduces the optical path of this portion of blue light inside the quantum-dot layer 5021 after it is recycled by the bottom reflector (not shown). Thus this portion of the light has even lower possibility of hitting quantum-dot particle and being down-converted. The quantum-dot film with the parallel arranged refractive asymmetric micro-prisms on the two surfaces of the input substrate is able to down-convert more blue light and produce more green light and more red light.

The present disclosure discloses a different but much more effective working mechanism which is based on light refraction. The parallel arranged refractive asymmetric micro-prisms on the two surfaces of the input substrate preserve large traveling angle of the incident light inside the quantum-dot layer, regardless the difference in the refractive indices of the quantum-dot layer and the input substrate, so that the optical path of the incident light inside the quantum-dot layer is much longer than the incident light's optical path inside a quantum-dot film whose working mechanism is based on light scattering. In addition, the refractive symmetric micro-prisms on the second exit surface of the exit substrate further increases the reflectance for the large angle incident light so that the incident light can be bouncing within the quantum-dot film more times before exiting the quantum-dot film. Both effectively extend the optical path of the incident light inside the quantum-dot film so that the possibility of hitting quantum-dot particles is much higher, which leads to higher down conversion efficiency and stronger output of the light re-emission. At the same time, fewer quantum-dot particles are needed to achieve certain power ratio between the incident light and the down-converted light, which not only reduces the cost of the quantum-dot film but also increases the optical efficiency because the secondary light abortion of the down-converted light by the quantum-dot particles is reduced because of lower particle density of quantum-dot particles. The working mechanism of light refraction may require not only the parallel arrangement of the refractive asymmetric micro-prisms on the two surfaces of the input substrate, but also the dimensions of the micro-prisms on both the input substrate and on exit substrate are sufficiently large to minimize light scattering, which are beyond and much larger than the dimensions of the light scattering features.

To sum up, the present disclosure provides novel quantum-dot films with refractive micro-features on input substrates and exit substrates, and related lighting methods and devices.

In an embodiment, the output surface of the exit substrate is deposited with refractive symmetric micro-prisms. The size of each symmetric micro-prism is sufficiently large to avoid scattering or diffusing the incident blue light. The refractive symmetric micro-prisms are adjacent to each other without gap between. The refractive symmetric micro-prisms on the output surface of the exit substrate are perpendicular to the input edge of the light guide plate. The manufacture processes and material shrinkage and scratching with the optical films during assembly and/or normal operations may cause rounded tip and rounded valley on the micro-prisms. The radius of the rounded tips and rounded valleys are as small as possible in order to enhance the refraction of light and diminish the scattering of the light. The manufacture processes and material shrinkage may cause curving, sagging, bumping and waviness on the surfaces of the micro-prisms.

In an embodiment, the luminescent quantum-dots are adapted to down-convert a first (shorter) wavelength first light and reemit second (longer) wavelength second lights. In an embodiment, the quantum-dots have one or more than one populations of quantum dots. Each population of quantum-dots is adapted to emit a dominant color with a peak wavelength and a bandwidth. In an embodiment, the color of the light emitted by the device can be controlled by the concentration of individual population of quantum-dots.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

As will be understood by persons of ordinary skill in the art, any of the foregoing device and/or processing components can be used in any suitable combination to form the quantum-dot film of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

What is claimed is:

1. A display backlight unit, comprising:
   at least one light source comprising a light emission window and adapted to emit first light with first wavelength through the light emission window;
   a light guide plate located adjacent to the light emission window of the at least one light source, the light guide plate including an input edge and a light-guide exit surface and adapted to receive the first light via the input edge and spread out the first light within the light guide plate, then extract the first light uniformly over the back light unit, the first light extracted exiting the light guide plate via the light-guide exit surface at a range of off-axis angles, and an illuminance of the first light extracted being allowed to have fluctuations across the back light unit; and
   a light down conversion film comprising at least one quantum-dot layer with more than one population of quantum dots and at least one input substrate, the input substrate disposed on the light-guide exit surface of the light guide plate, the quantum dots adapted to absorb a part of the first light with first wavelength which exits the light guide plate and the input substrate in sequence before down-converting into second light with second wavelength and reemitting, another part of the first light which is unabsorbed passing through the light down conversion film, and the first wavelength being shorter than the second wavelength;

wherein the input substrate includes an input surface facing towards the light guide plate and a first exit surface facing towards the quantum-dot layer, the input surface comprises a plurality of first refractive asymmetric micro-prisms, wherein each of the first refractive asymmetric micro-prisms includes a first steep segment facing toward the input edge of the light guide plate and a first shallow segment connected to the first steep segment, the first exit surface of the input substrate is facing the quantum-dot layer, the first exit surface of the input substrate comprises a plurality of second refractive asymmetric micro-prisms and each includes a second steep segment facing away from the input edge of the light guide plate and a second shallow segment connected to the second steep segment, the first steep segments and the first shallow segments adjacent to each other form a first rounded tip and a first rounded valley for refraction of the first light and the second light, and the second steep segments and the second shallow segments adjacent to each other form a second rounded tip and a second rounded valley for refraction of the first light and the second light.

2. The display back light unit of claim 1, wherein the first refractive asymmetric micro-prisms and the second refractive asymmetric micro-prisms are parallel to the input edge of the light guide plate, each of the first refractive asymmetric micro-prisms and the second refractive asymmetric micro-prisms on the input substrate has a base width between 10 um to 200 um, each of the first rounded tips of the first refractive asymmetric micro-prisms and the second rounded tips of the second refractive asymmetric micro-prisms has a radius smaller than 10 um, each of the first rounded valleys between the first refractive asymmetric micro-prisms and the second rounded valleys between the second refractive asymmetric micro-prisms has a radius smaller than 10 um.

3. The display back light unit of claim 1, wherein both of a surface of the first refractive asymmetric micro-prisms including the first rounded tips and a surface of the first refractive asymmetric micro-prisms including the rounded tips have random areas of plane, curving, sagging, bumping and waviness.

4. The display back light unit of claim 1, wherein each of the first refractive asymmetric micro-prisms and second refractive asymmetric micro-prisms on the input substrate has a height between 1 um to 50 um.

5. The display back light unit of claim 1, wherein each of the first refractive asymmetric micro-prisms has a tilt angle of the first steep segments and the input surface between 50 degrees to 89 degrees, and each the second refractive asymmetric micro-prisms on the input substrate has a tilt angle of the second steep segments and the first exit surface between 50 degrees to 89 degrees.

6. The display back light unit of claim 1, wherein each of the first refractive asymmetric micro-prisms on the input substrate has a tilt angle of the first shallow segment and the input surface between 1 degree to 40 degrees, and each if the second refractive asymmetric micro-prisms on the input substrate has a tilt angle of the second shallow segment and the first exit surface between 1 degree to 40 degrees.

7. The display back light unit of claim 1, wherein the light down conversion film further comprises at least one exit substrate being away from the light guide plate and attached to a side of the quantum-dot layer opposite to the input substrate, and the quantum-dot layer is sandwiched between the input substrate and the exit substrate, wherein the part of the first light which is unabsorbed is adapted to pass through the light down conversion film and towards the exit substrate.

8. The display back light unit of claim 7, wherein the exit substrate comprises a second exit surface and a plurality of refractive symmetric micro-prisms with tips and valleys located on the second exit surface.

9. The display back light unit of claim 8, wherein the tips and valleys of the refractive symmetric micro-prisms of the exit substrate are sharp.

10. The display back light unit of claim 8, wherein cross-sections of the refractive symmetric micro-prisms are perpendicular to the input edge of the light guide plate, each of the refractive symmetric micro-prisms on the exit substrate has a base width between 10 um to 200 um, the tips of the refractive symmetric micro-prisms have radius smaller than 10 um, the valleys between the refractive symmetric micro-prisms have radius smaller than 10 um.

11. The display back light unit of claim 8, wherein each refractive symmetric micro-prism on the exit substrate has a first segment and a second segment that are connected with each other and forming an included angle between 60 degrees to 120 degrees therebetween.

12. The display back light unit of claim 11, wherein the first segment and the second segment of the refractive symmetric micro-prisms on the exit substrate have tilt angles between 30 degrees to 60 degrees.

13. The display back light unit of claim 8, wherein the refractive symmetric micro-prisms on the exit substrate have heights between 1 um to 50 um.

14. The display back light unit of claim 8, wherein a refractive index of the quantum-dot layer, a refractive index of the input substrate and a refractive index of the exit substrate are identical.

15. The display back light unit of claim 8, wherein a refractive index of the quantum-dot layer, a refractive index of the input substrate, and a refractive index of the exit substrate are different.

16. A light down conversion film, comprising:
a quantum-dot layer with more than one population of quantum-dots, and an input substrate including an input surface and a first exit surface that are opposite to each other and a plurality of first refractive asymmetric micro-prisms disposed on the input surface, the input substrate for receiving first light from the input surface, the first exit surface facing towards the quantum-dot layer, the quantum dots for absorbing a part of the first light with first wavelength from the first exit surface of the input substrate then down-converting into second light with second wavelength and reemitting, another part of the first light which is unabsorbed passing through the quantum-dot layer, each of the first refractive asymmetric micro-prisms including a first steep segment facing away from the quantum-dot layer and a first shallow segment connected to the first steep segment, the first steep segments and the first shallow segments adjacent to each other forming a first rounded tip and a first rounded valley therebetween for refraction of the first light and the second light, and the first wavelength being shorter than the second wavelength.

17. The light down conversion film of claim 16, wherein the first exit surface of the input substrate comprises a plurality of second refractive asymmetric micro-prisms each including a second steep segment facing towards the quantum-dot layer and a second shallow segment connected to the second steep segment, wherein the second steep segments and the second shallow segments adjacent to each other form a second rounded tip and a second rounded valley therebetween for refraction of the first light and the second light.

18. The light down conversion film of claim 16, further comprising at least one exit substrate disposed on a side of the quantum-dot layer away from the input substrate, the quantum-dot layer sandwiched between the input substrate and the exit substrate, the part of the first light which is unabsorbed adapted to pass through the quantum-dot layer and towards the exit substrate, the exit substrate comprising an second exit surface located oppositely away from the quantum-dot layer and a plurality of refractive symmetric micro-prisms with tips and valleys disposed on the second exit surface.

19. A light down conversion film, comprising:
at least one quantum-dot layer with more than one population of quantum-dots, and an input substrate comprising an input surface facing towards the quantum-dot layer, a first exit surface facing towards the quantum-dot layer and a plurality of refractive asymmetric micro-prisms disposed on the first exit surface, the input substrate for receiving first light from the input surface, the quantum-dots for absorbing a part of the first light with first wavelength from the first exit surface of the input substrate then down-converting into second light with second wavelength and reemitting, another part of the first light which is unabsorbed passing through the quantum-dot layer, each of the refractive asymmetric micro-prisms including a first steep segment facing towards the quantum-dot layer and a first shallow segment connected to the first steep segment, the first steep segments and the first shallow segments adjacent to each other forming a first rounded tip and a first rounded valley for refraction of the first light and the second light, and the first wavelength being shorter than the second wavelength.

20. The light down conversion film of claim 19, wherein the light down conversion film further comprising at least one exit substrate disposed on a side of the quantum-dot layer away from the input substrate, the quantum-dot layer sandwiched between the input substrate and the exit substrate, the part of the first light which is unabsorbed adapted to pass through the quantum-dot layer and towards the exit substrate, the exit substrate comprising a second exit surface and a plurality of refractive symmetric micro-prisms with tips and valleys disposed on the second exit surface for refraction of the first light and the second light.

* * * * *